US011668129B2

(12) United States Patent
Singh et al.

(10) Patent No.: US 11,668,129 B2
(45) **Date of Patent: *Jun. 6, 2023**

(54) POWER POCKET SLIDING DOOR

(71) Applicant: Rivian IP Holdings, LLC, Irvine, CA (US)

(72) Inventors: Rajinder Pal Singh, Plymouth, MI (US); Randall Frank, Dearborn, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,023

(22) Filed: Apr. 25, 2022

(65) Prior Publication Data

US 2022/0243516 A1 Aug. 4, 2022

Related U.S. Application Data

(63) Continuation of application No. 16/939,539, filed on Jul. 27, 2020, now Pat. No. 11,339,601.

(51) Int. Cl.

*B60J 5/06* (2006.01)
*E05F 15/652* (2015.01)
*E06B 1/34* (2006.01)

(52) U.S. Cl.

CPC .............. *E05F 15/652* (2015.01); *E06B 1/34* (2013.01); *E05Y 2201/10* (2013.01); *E05Y 2201/628* (2013.01); *E05Y 2900/50* (2013.01)

(58) Field of Classification Search

CPC .. E05F 15/652; E05F 7/04; E06B 1/34; E06B 3/4636; E06B 3/4654; E05Y 2201/10; E05Y 2201/628; E05Y 2201/222; E05Y 2201/696; E05Y 2201/702; E05Y 2900/50; E05Y 2900/14; E05Y 2600/41; E05Y 2600/46; E05Y 2600/526; E05Y 2800/344; E05Y 2800/406; E05Y 2800/422

(Continued)

(56) References Cited

U.S. PATENT DOCUMENTS

| | | | |
|---|---|---|---|
| 1,212,043 | A | 1/1917 | Freeman |
| 1,431,413 | A | 10/1922 | Myers |

(Continued)

FOREIGN PATENT DOCUMENTS

| | | | |
|---|---|---|---|
| WO | 2018132077 | A1 | 7/2018 |

*Primary Examiner* — Jerry E Redman
(74) *Attorney, Agent, or Firm* — Haley Guiliano LLP

(57) ABSTRACT

A system for managing opening and closing a pocket door includes a spindle, an actuator, and brackets. The spindle extends along a longitudinal axis between first and second ends, and is configured to be coupled to the pocket door. The actuator is coupled to the spindle and is configured to cause the spindle to move axially along the longitudinal axis. The brackets are connected to the spindle at each end and are constrained from longitudinal motion relative to the spindle. The brackets are configured to affix the spindle to the pocket door. A bushing system couples each bracket to the spindle and is configured to dampen impact between the spindle and the brackets. For example, the bushing system may include lobed elements, made of a rubber material, that engage each other to transmit azimuthal forces. In some embodiments, another actuator is included to improve cycle life and redundancy.

20 Claims, 9 Drawing Sheets

(58) Field of Classification Search
USPC .................................................. 49/360, 362
See application file for complete search history.

(56) References Cited

U.S. PATENT DOCUMENTS 1,917,415 A * 7/1933 Woodruff ................ F16L 59/04 49/362
2,531,116 A 11/1950 Harold
3,237,250 A 3/1966 Scoville
3,327,428 A * 6/1967 Horton .................... E05F 15/56 49/257
3,533,188 A * 10/1970 Griffith ................... E05F 15/60 318/135
4,050,191 A 9/1977 Azuma
4,104,826 A 8/1978 Wadford
4,296,570 A 10/1981 Balbach et al.
4,330,960 A 5/1982 Hasemann et al.
4,698,938 A 10/1987 Huber
4,735,292 A * 4/1988 Munz ...................... B66B 13/08 187/324
5,148,631 A * 9/1992 Bayard ................. E05F 15/565 49/449
5,193,430 A * 3/1993 Ilgovsky ................. F15B 15/24 92/143
5,319,990 A 6/1994 Veale et al.
5,483,769 A * 1/1996 Zweili ................... E05F 15/638 49/118
5,644,869 A * 7/1997 Buchanan, Jr. ............ B60J 5/06 49/362
5,787,636 A * 8/1998 Buchanan, Jr. ....... E05F 15/652 49/360
6,216,394 B1 4/2001 Fenelon
6,708,448 B2 * 3/2004 Zappa ..................... B66B 13/06 49/362
6,820,369 B2 11/2004 Fenelon
7,231,841 B2 6/2007 Ueki
7,971,391 B2 * 7/2011 Harie .................... E05F 15/635 49/362
8,132,653 B2 3/2012 Flynn
8,661,733 B2 * 3/2014 Lee ....................... E05B 83/363 49/362
8,912,455 B2 * 12/2014 Laubstein ............ G01G 21/286 60/473
8,978,301 B2 * 3/2015 Ueda ....................... E05B 81/13 292/201
9,340,215 B2 * 5/2016 Masuda .............. E05B 65/0847
9,702,178 B2 * 7/2017 Takayama ............. E05F 15/632
9,874,050 B2 * 1/2018 Mair ........................ E05F 15/00
10,494,852 B2 * 12/2019 Fujita ................... B61D 19/026
10,641,043 B2 5/2020 Sevits et al.
11,162,294 B2 * 11/2021 Fujita ...................... E05B 85/00
11,175,176 B2 * 11/2021 Oda ..................... G01G 21/286
11,339,601 B2 * 5/2022 Singh .................... E06B 3/4654
2002/0152684 A1 10/2002 Fink
2008/0190151 A1 8/2008 Ritt et al.
2008/0256872 A1 10/2008 Finke
2009/0025296 A1 1/2009 Petner
2011/0214349 A1 9/2011 Chan
2013/0340346 A1 * 12/2013 Ueda ....................... E05B 83/40 49/280
2015/0054294 A1 * 2/2015 Uno ........................ E05B 81/38 292/194
2020/0392778 A1 * 12/2020 Houk .................... E05F 15/652

* cited by examiner

POWER POCKET SLIDING DOOR

This application is a continuation of U.S. patent application Ser. No. 16/939,539 filed on Jul. 27, 2020, now U.S. Pat. No. 11,339,601, the disclosure of which is hereby incorporated by reference herein in its entirety. The present disclosure is directed towards a power pocket sliding door, and more particularly towards a sliding door that is actuated using a spindle and brackets.

INTRODUCTION

Summary

The present disclosure is directed to systems for managing opening and closing a pocket door (e.g., of a vehicle). In some embodiments, the system includes a rail, a pocket door, an actuator, and a spindle. The rail has a longitudinal axis and is arranged along a top of a doorway. The pocket door is engaged with the rail system and extends below the rail, and is configured to translate along the longitudinal axis. The spindle extends along the longitudinal axis and is coupled to the pocket door. The actuator is coupled to the spindle and is configured to cause the spindle to move axially along the longitudinal axis.

In some embodiments, the pocket door has a top side, a first longitudinal side, and a second longitudinal side, and the spindle has a first end and a second end. In some such embodiments, a first bracket is connected to the pocket door on the first longitudinal side at the top side and a second bracket connected to the pocket door on the second longitudinal side at the top side. The first and second brackets are connected to the spindle such that they are constrained from longitudinal motion relative to the spindle.

In some embodiments, the system includes at least one bushing system. For example, in some embodiments, the system includes a first bushing system that couples the first bracket to the first end of the spindle, and that is configured dampen impact between the spindle and the pocket door. In a further example, in some embodiments, the system includes a second bushing system that couples the second bracket to the second end of the spindle, and that is configured dampen impact between the spindle and the pocket door. In an illustrative example, each bushing system may include three members. A first member is connected to the first end of the spindle, a second member is connected to the first bracket such that the second member is constrained from rotating about the longitudinal axis relative to the first bracket, and a third member is affixed to the second member and engaged with the first member to dampen impact between the first member and the third member. The third member may include a rubber material to dampen the impact. In some embodiments, the first member includes a first extension that extends along the longitudinal axis through the third member, the second member, and the first bracket. In some such embodiments, the system includes a fastener engaged with the first extension to apply an axial preload along the longitudinal axis to the first bracket, the second member, and the first member. In some embodiments, the first member includes a plurality of lobes arranged azimuthally around the longitudinal axis, and the third member includes a plurality of lobe recesses arranged azimuthally around the longitudinal axis. The plurality of lobes engage with the plurality of lobe recesses to transfer an azimuthal load.

In some embodiments, the spindle is threaded, and the actuator engages with threads of the spindle. In some embodiments, the rail includes a cutout through which the spindle is removable while coupled to the actuator.

In some embodiments, the system includes a second actuator coupled to the spindle that is configured to cause the spindle to move axially along the longitudinal axis. The first actuator and the second actuator are spaced along the longitudinal axis by a predetermined distance. For example, the second actuator provides redundancy, improved cycle life, or both.

In some embodiments, the actuator is arranged vertically and substantially above the spindle. For example, in some embodiments, the system includes a bracket that attaches the actuator and the rail, and that is arranged on top of the rail.

In some embodiments, the present disclosure is directed to a system for managing opening and closing a pocket door, wherein the system includes a spindle, an actuator, and a set of brackets. The spindle has a first end and a second end, extends along the longitudinal axis, and is configured to be coupled to the pocket door. The actuator is coupled to the spindle and is configured to cause the spindle to move axially along the longitudinal axis. A first bracket is connected to the spindle at the first end such that the first bracket is constrained from longitudinal motion relative to the spindle. The first bracket is configured to be connected to the pocket door. A second bracket is connected to the spindle at the second end such that the second bracket is constrained from longitudinal motion relative to the spindle. The second bracket is configured to be connected to the pocket door. For example, in some embodiments, the system includes a bushing system for dampening impact between the brackets and the spindle. In some embodiments, the system includes a bracket for attaching the actuator to a rail.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Pocket doors are generally easy to open when space is constrained, and due to packaging constraints are manually operated. The systems of the present disclosure allow for automatic operation of a pocket door, in a delivery vehicle for example.

Figure 1:
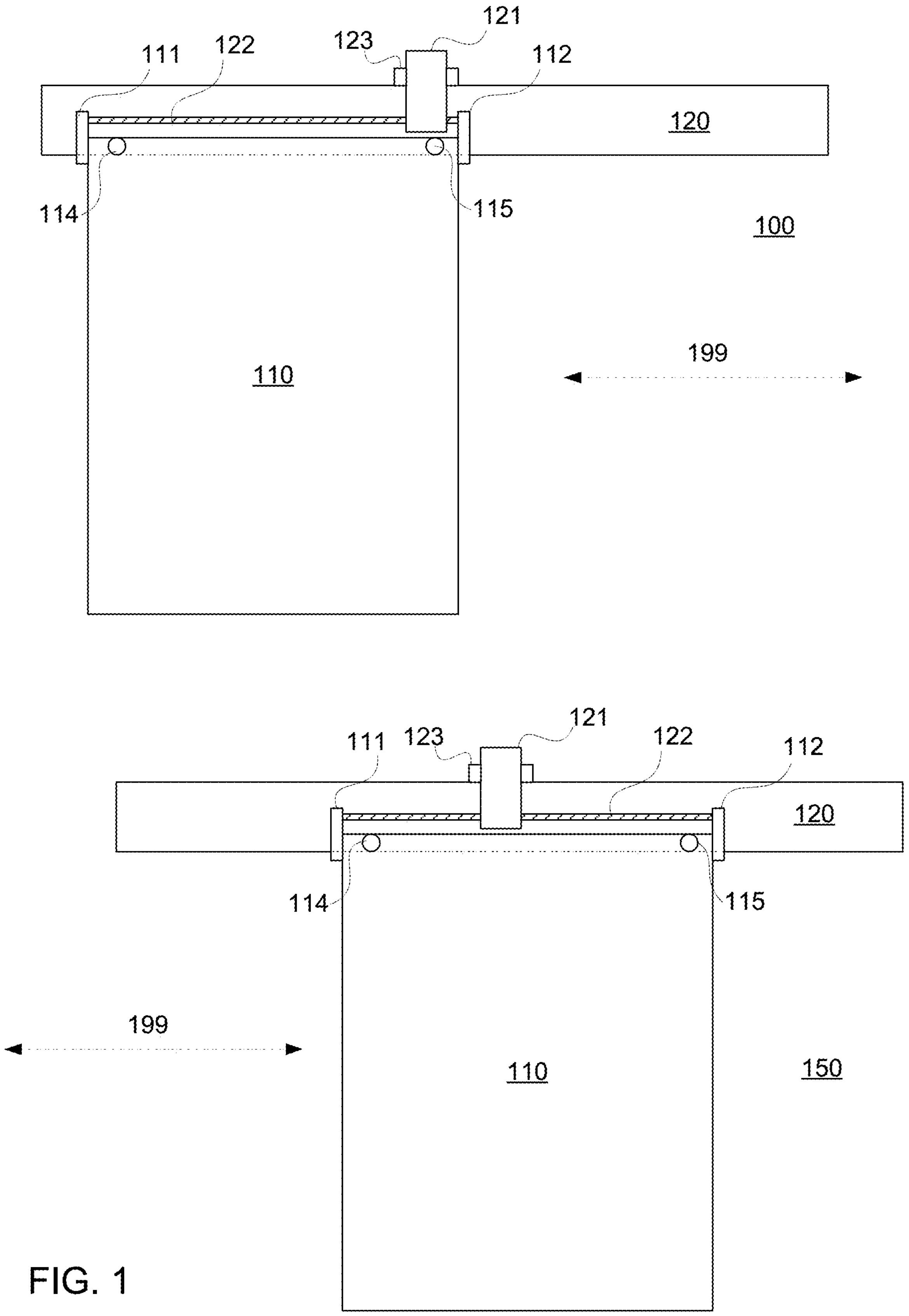
FIG. 1 shows an illustrative power pocket sliding door in two positions, in accordance with some embodiments of the present disclosure.

FIG. 1 shows an illustrative power pocket sliding door in two positions, in accordance with some embodiments of the present disclosure. Panels 100 and 150 each show sliding door 110 (in a first position), brackets 111 and 112, rollers 114 and 115, rail 120, actuator 121, bracket 123, and spindle 122. Rollers 114 are affixed to sliding door 110 and travel along rail 120 such that sliding door 110 is capable of moving along axis 199. Actuator 121 is coupled to spindle 122 and is configured to cause spindle 122 to move along axis 199. Spindle 122 is affixed to sliding door 110 by brackets 111 and 112. For example, brackets 111 and 112 may be connected to sliding door 110 by fasteners, bushings, mechanical interlocks, any other suitable affixment, or any combination thereof. Sliding door 110 may be capable of achieving an open position, a closed position, and any intermediate position as controlled by actuator 121. To illustrate, sliding door 110 may be arranged inside of a vehicle (e.g., separating the cab from a cargo area), on the side of a vehicle (e.g., a side door of a vehicle, adjacent to a cargo area), any other suitable location, or any combination thereof.

In an illustrative example, actuator 121 may be coupled to an actuator drive that provides electrical power, control signals, or both. Actuator 121 may include an electric motor, a stepper motor, a linear actuator, any other suitable actuator, or any combination thereof. For example, actuator 121 may include a DC motor and an actuator may provide an electric DC signal to control the direction, speed, position, or a combination thereof of an actuation of actuator 121. Although not illustrated in FIG. 1, one or more encoders, position sensors, limit sensors, limit switches, bump-stops, any other suitable components for indicating or controlling a position of sliding door 110, or any combination thereof may be included to manage operation of sliding door 110. In some embodiments, one or more current sensors, voltage sensors, or both may be included to indicate an operating characteristic of actuator 121 (e.g., a current sensor may be configured to detect an increase in current corresponding to an end of travel).

In some embodiments, the present disclosure is directed to a drive unit inside an upper track (or rail) for a pocket sliding door that includes a spindle drive unit. For example, an actuator such as a motor may be mounted to the upper track, and the spindle is mounted to a roller assembly and the door. When the motor is powered, the spindle, being constrained, forces the door to move in a desired direction.

In some embodiments, the systems of the present disclosure allow for efficient packaging, use of a spindle drive, and a reduced total cost of the system. In some embodiments, the systems of the present disclosure allow for ease of installation, repair, system replacement, and component replacement.

Figure 2:
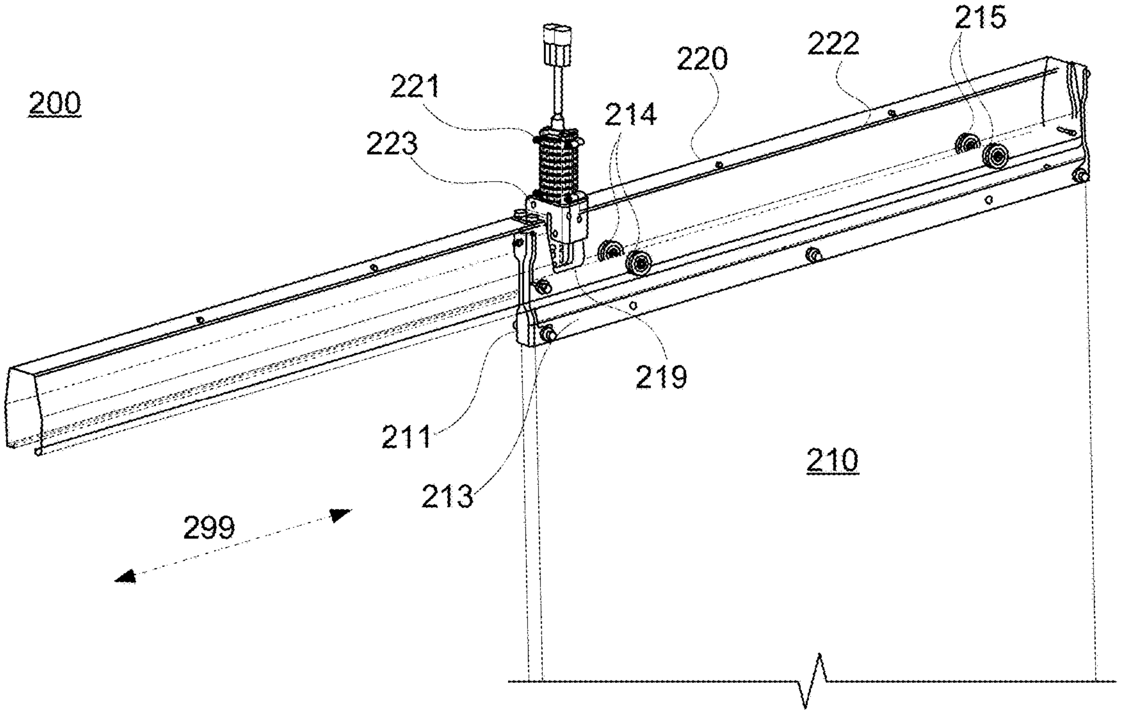
FIG. 2 shows a perspective view of an illustrative power pocket sliding door system in an open position, in accordance with some embodiments of the present disclosure.
Figure 3:
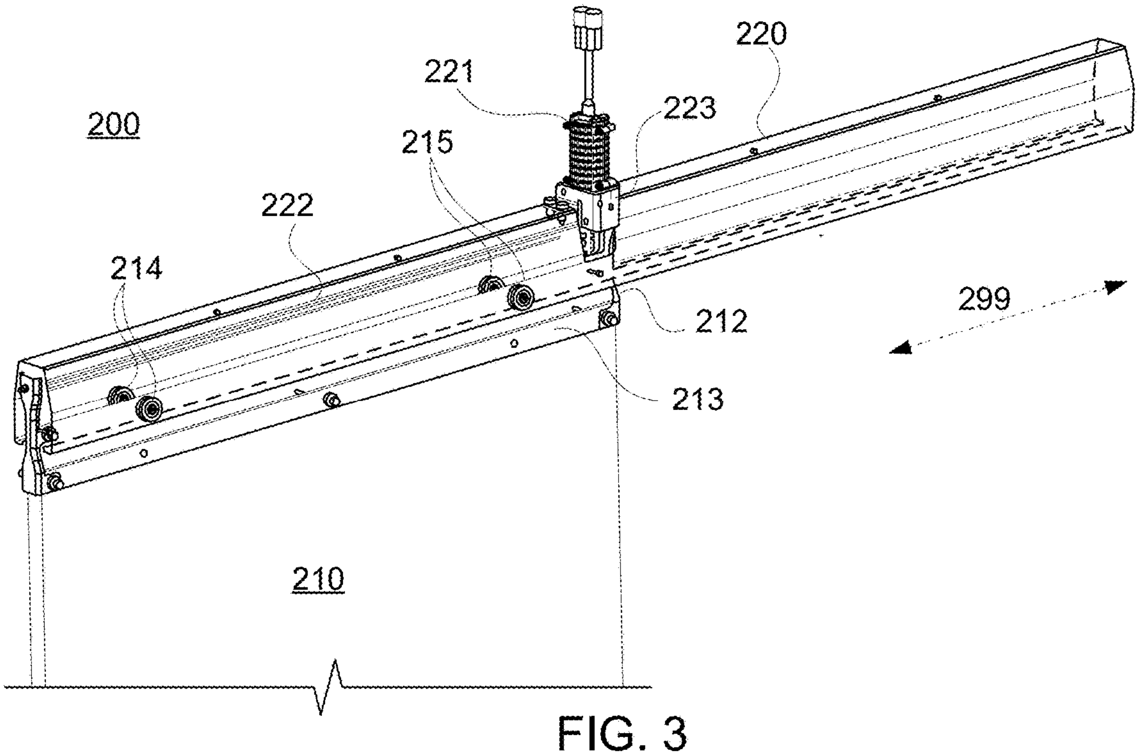
FIG. 3 shows a perspective view of the illustrative power pocket sliding door system of FIG. 2 in a closed position, in accordance with some embodiments of the present disclosure.
Figure 4:
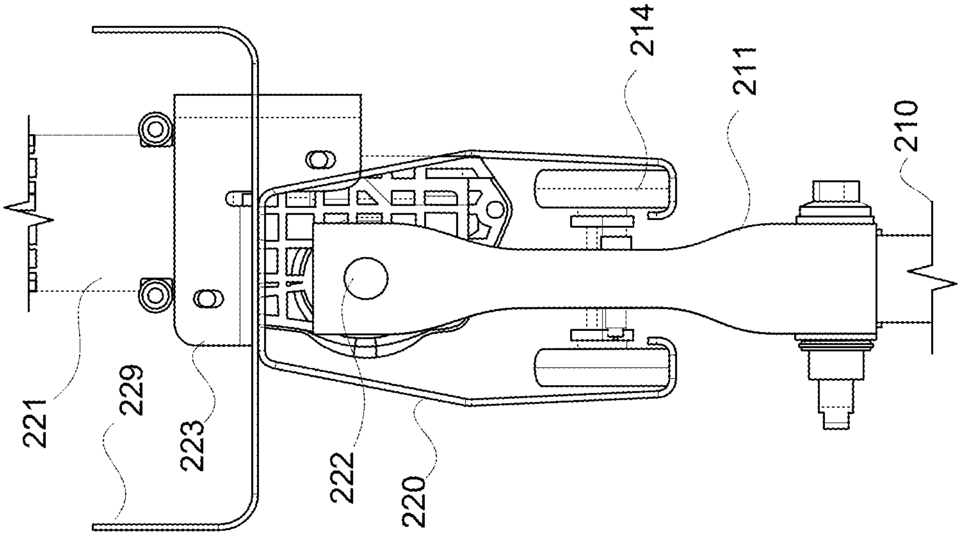
FIG. 4 shows an end view of the illustrative power pocket sliding door system of FIGS. 2-3, in accordance with some embodiments of the present disclosure.

FIG. 2 shows a perspective view of illustrative power pocket sliding door system 200 in an open position, in accordance with some embodiments of the present disclosure. FIG. 3 shows a perspective view of illustrative power pocket sliding door system 200 of FIG. 2 in a closed position, in accordance with some embodiments of the present disclosure. FIG. 4 shows an end view of the illustrative power pocket sliding door system 200 of FIGS. 2-3, in accordance with some embodiments of the present disclosure. Power pocket sliding door system 200 includes sliding door 210, brackets 211 and 212, rollers 214 and 215, rail 220, actuator 221, bracket 223, and spindle 222. Rollers 214 and 215 are affixed to sliding door 210 and travel along rail 220 such that sliding door 210 is capable of moving along axis 299. Actuator 221 is coupled to spindle 222 and is configured to cause spindle 222 to move along axis 299. Spindle 222 is affixed to sliding door 210 by brackets 211 and 212. For example, brackets 211 and 212 may be connected to sliding door 210 by fasteners, bushings, mechanical interlocks, any other suitable affixment, or any combination thereof. Sliding door 210 may be capable of achieving an open position, a closed position, and any intermediate position as controlled by actuator 221. In some embodiments, rail 220, actuator 221, bracket 223, or a combination thereof are secured to a vehicle or other structure by a structural element (e.g., structural element 229, as illustrated). As illustrated, rail 220 includes cutout 219 through which spindle 222 is removable while coupled to actuator 221. For example, actuator 221 and spindle 222 may be decoupled from sliding door 210 (e.g., by disconnecting brackets 211 and 212), and actuator 221 and spindle 222 may be removed through cutout 219.

Figure 5:
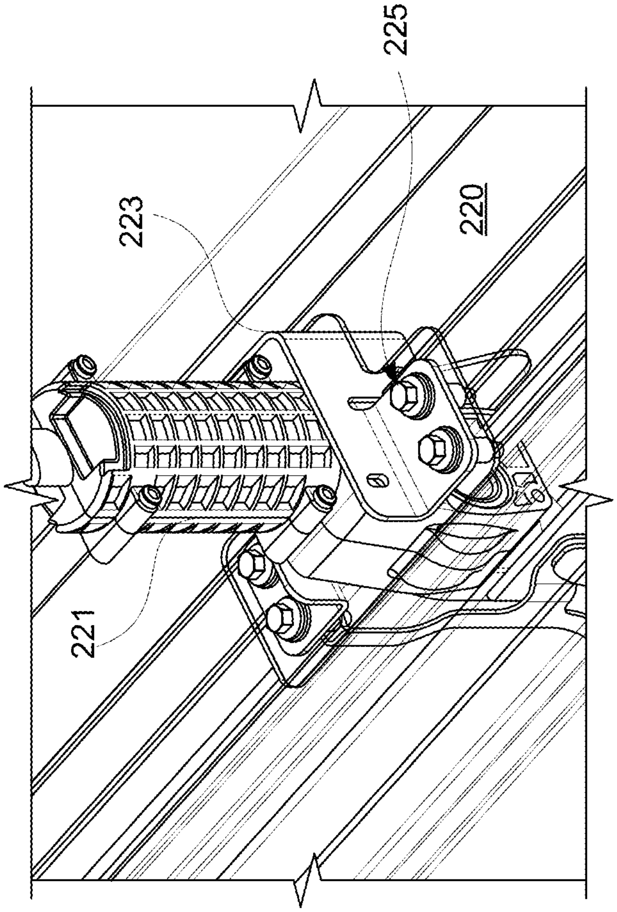
FIG. 5 shows a perspective view of an actuator of the illustrative power pocket sliding door system of FIGS. 2-4, in accordance with some embodiments of the present disclosure.

FIG. 5 shows a perspective view of actuator 221 of the illustrative power pocket sliding door system 200 of FIGS. 2-4, in accordance with some embodiments of the present disclosure. Actuator 221 is affixed to rail 220 by bracket 223. As illustrated, bracket 223 is affixed to actuator 221, and bracket 223 is affixed to rail 220 by fasteners 225 (e.g., four fasteners as illustrated). In some embodiments, bracket 223 is affixed to rail 220 using fasteners and one or more bushings (e.g., rubber bushings) to dampen vibration, impact, or both from being transmitted between actuator 221 and rail 220 (e.g., to soften operation and limit mechanical stresses or wear).

Figure 6:
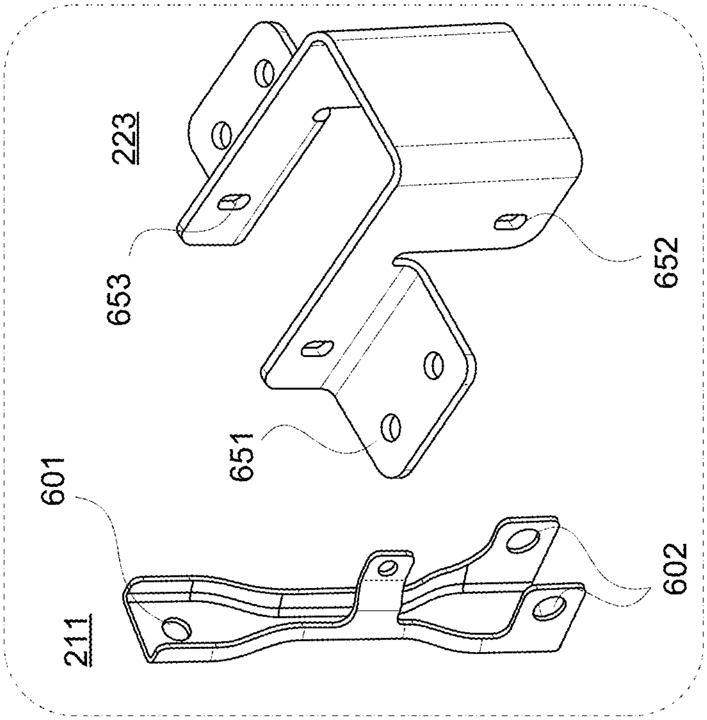
FIG. 6 shows a perspective view of two brackets of the illustrative power pocket sliding door system of FIGS. 2-4, in accordance with some embodiments of the present disclosure.

FIG. 6 shows a perspective view of brackets 211 and 223 of illustrative power pocket sliding door system 200 of FIGS. 2-4, in accordance with some embodiments of the present disclosure. Bracket 212 may be the same as, similar to, a mirrored design of, or otherwise related to bracket 211 and the description of bracket 211 will substantially apply to bracket 212. As illustrated, bracket 211 includes through feature 601 (e.g., a hole or slot) for affixing to spindle 222. As illustrated, bracket 211 also includes through features 602 (e.g., holes or slots) for affixing to sliding door 210. Bracket 211 may include any suitable features such as holes, studs, threads, clips, claps, mechanical interlocks, pins, locating features, any other suitable features, or any combination thereof for affixing to a spindle and a sliding door. As illustrated, bracket 223 includes through features 652 and 653 (e.g., each a hole or slot) for affixing to actuator 221. As illustrated, bracket 223 also includes section 651 (e.g., which may include through features such as holes or slots) for affixing to rail 220 or other suitable structural element. Bracket 223 may include any suitable features such as holes, studs, threads, clips, claps, mechanical interlocks, pins, locating features, any other suitable features, or any combination thereof for affixing to an actuator and a rail or structural element. In an illustrative example, brackets 211 and 223 may be made of sheet metal (e.g., cut, rolled, bent, stamped, or otherwise processed to form a final shape), made of plastic, machined from a billet (e.g., metal or plastic), molded (e.g., injection molded), formed using any other suitable process and materials, or any combination thereof.

Figure 7:
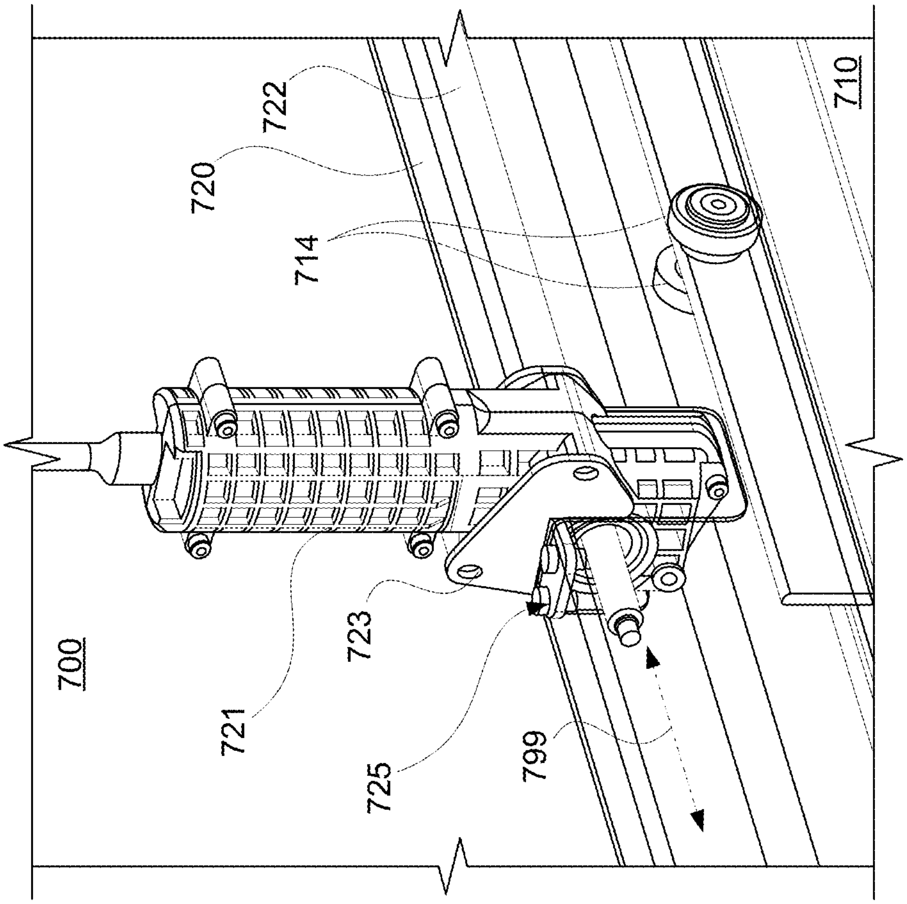
FIG. 7 shows a perspective view of an actuator and bracket of a power pocket sliding door system, in accordance with some embodiments of the present disclosure.

FIG. 7 shows a perspective view of actuator 721 and bracket 723 of power pocket sliding door system 700, in accordance with some embodiments of the present disclosure. Power pocket sliding door system 700 includes sliding door 710, rollers 714 (e.g., and another set of rollers not illustrated in FIG. 7), rail 720, actuator 721, bracket 723, and spindle 722. Rollers 714 are affixed to sliding door 710 and travel along rail 720 such that sliding door 710 is capable of moving along axis 799. Actuator 721 is coupled to spindle 722 and is configured to cause spindle 722 to move along axis 799. Spindle 722 may be affixed to sliding door 710 using any suitable component or technique (e.g., although not shown, a bracket or other affixment may be included). In an illustrative example, bracket 723, or a similar bracket, may be included instead of bracket 223 in power pocket sliding door system 200 of FIGS. 2-4.

Figure 8:
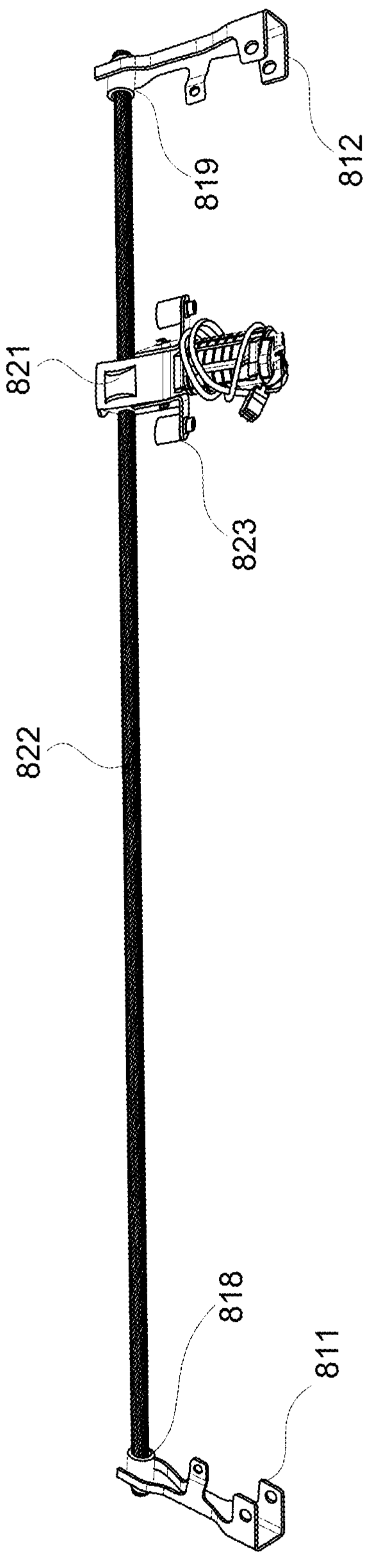
FIG. 8 shows a side view of an actuator, a spindle, and brackets for affixing to a sliding door, in accordance with some embodiments of the present disclosure.
Figure 9:
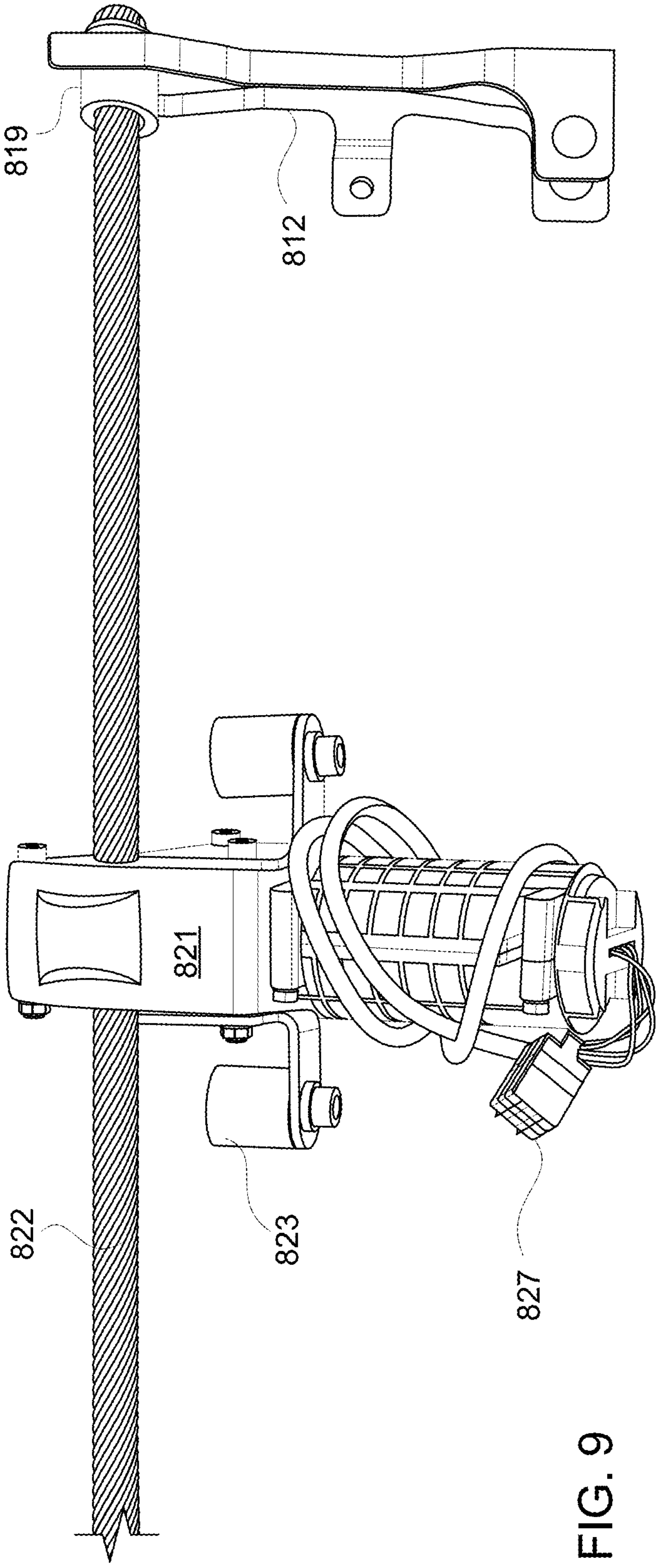
FIG. 9 shows an enlarged side view of the actuator, the spindle, and a bracket of FIG. 8, in accordance with some embodiments of the present disclosure.

FIG. 8 shows a side view of actuator 821, spindle 822, joints 818 and 819, and brackets 811, 812, and 823 for affixing to a sliding door (not shown), in accordance with some embodiments of the present disclosure. FIG. 9 shows an enlarged side view of actuator 821, spindle 822, joint 819, and brackets 812 and 823, in accordance with some embodiments of the present disclosure. Actuator 821, when installed, may be rotated 180° (e.g., as shown in FIGS. 2-3), or oriented in any other suitable position relative to spindle 822 as compared to the illustration of FIGS. 8-9. Bracket 823 is configured to secure actuator 821 to a rail or structural element. Brackets 811 and 812 are configured to couple a sliding door to spindle 822 such that the sliding door moves with spindle 822 when actuated. Actuator 821 is configured to actuate spindle 822, thus causing the sliding door to move. Joints 818 and 819, which may include bushings, dampeners, or other suitable components, are configured to couple respective brackets 811 and 812 to spindle 822. In some embodiments, either of brackets 811 and 812, joints 818 and 819, or a combination thereof constrains rotation of spindle 822. In some embodiments, a sliding door may include brackets 811 and 812 as integrated features, or suitable integrated features for securing to spindle 822, and separate brackets are not needed. Connector 827 is configured to couple to a mating connector to provide electrical power, control signals, or both to actuator 821. For example, connector 827 may include two electrical terminals for proving DC electrical power, or any other suitable electrical power (e.g., AC power, pulsed power) to actuator 821.

Figure 10:
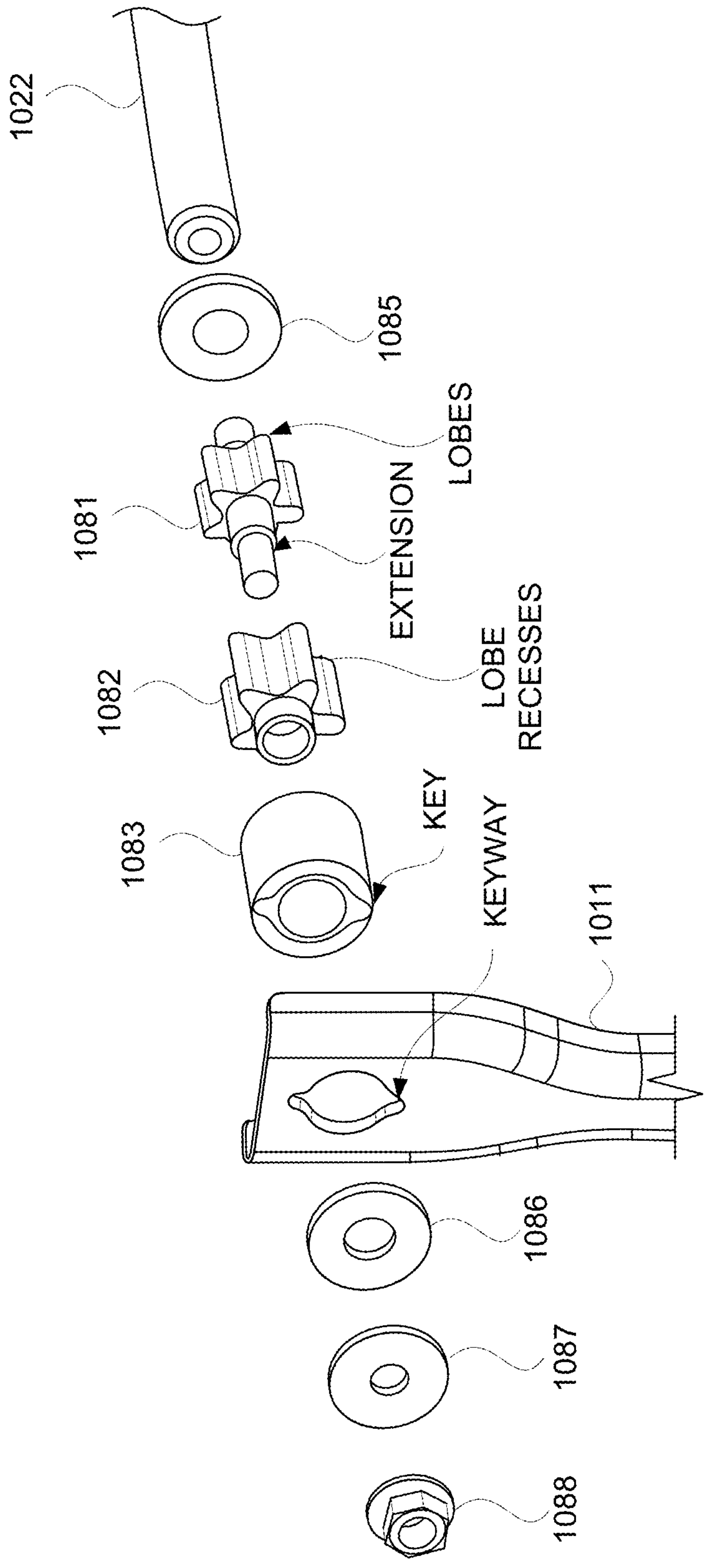
FIG. 10 shows an exploded perspective view of a joint between a spindle and a bracket for affixing a sliding door, in accordance with some embodiments of the present disclosure.

FIG. 10 shows an exploded perspective view of a joint between spindle 1022 and bracket 1011 for affixing a sliding door, in accordance with some embodiments of the present disclosure. A bushing system may include element 1081, element 1082, element 1083, fastener 1088, washers 1085-1087, any other suitable components (not shown), or any combination thereof. As illustrated, element 1081 engages with or otherwise connects to spindle 1022 (e.g., using a threaded interface with washer 1085 arranged between). Element 1081 includes a plurality of lobes arranged azimuthally around a longitudinal axis (e.g., the axis of spindle 1022) and an extension that extends along the longitudinal axis through third member 1083, second member 1082, and bracket 1011, configured to be secured by fastener 1088. In some embodiments fastener 1088 is engaged with the extension of element 1081 to apply an axial preload along the longitudinal axis to bracket 1011, element 1082, and element 1083. Element 1083 is configured to connect to bracket 1011 (e.g., as illustrated, the keys of element 1083 engage with the keyways of bracket 1011). For example, element 1083 is connected to bracket 1011 such that element 1183 is constrained from rotating about the longitudinal axis relative to bracket 1011. Element 1082 is configured to slide axially over element 1081 such that the lobes of element 1081 are arranged within respective lobe recesses of element 1082. For example, the plurality of lobes engage with the plurality of lobe recesses to transfer an azimuthal load. Element 1082 is configured to dampen impact between element 1081 and element 1083. To illustrate, element 1082 may include a rubber material or other suitable dampening material.

In an illustrative example, a power pocket sliding door system may include two bushing systems such as that shown in FIG. 10 (e.g., one at each end of the sliding door). Each bushing system couples a respective bracket to a respective end of the spindle (e.g., spindle 1022), and may be configured to dampen impact between the spindle and the sliding door.

Figure 11:
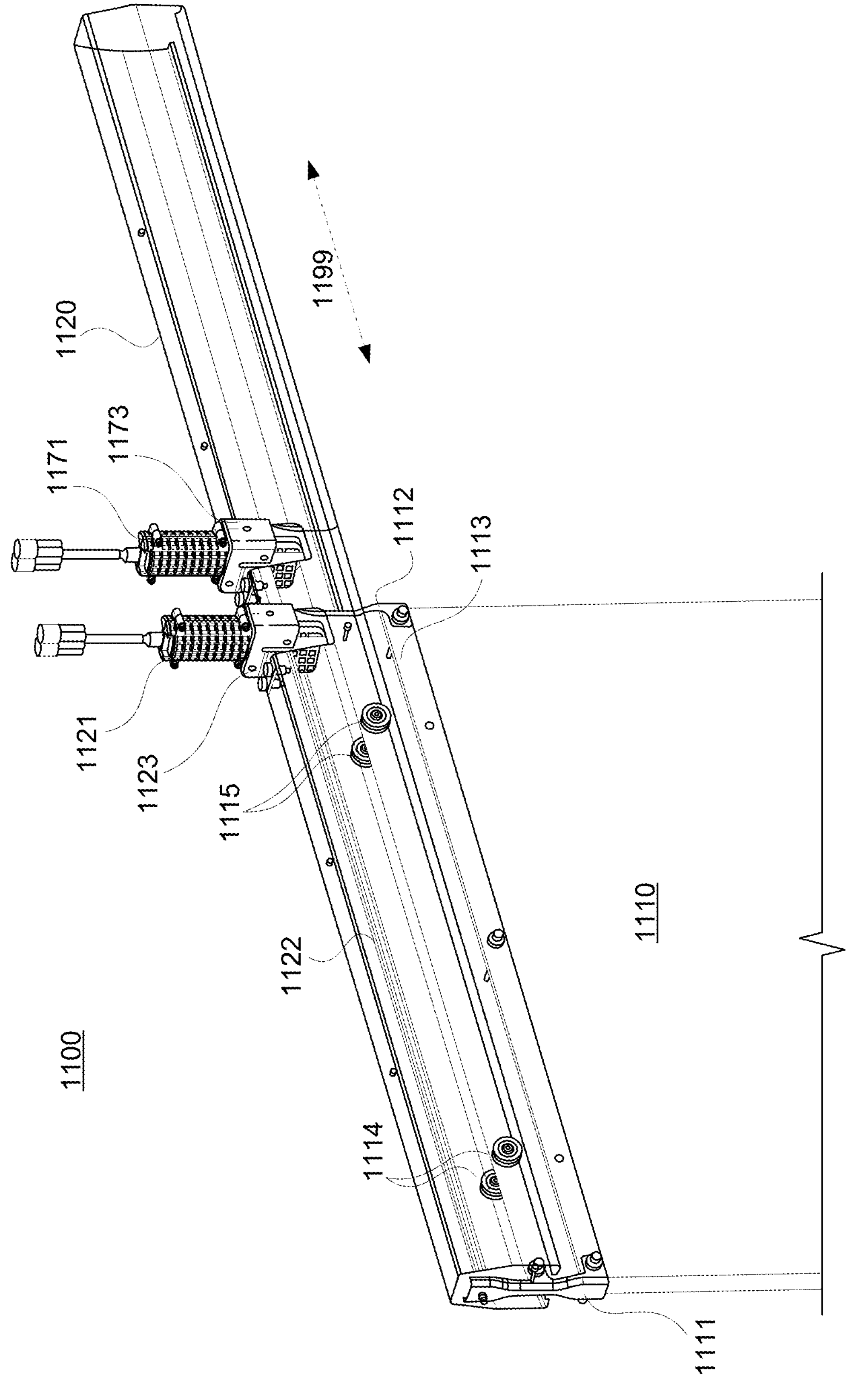
FIG. 11 shows a perspective view of an illustrative power pocket sliding door system having two actuators, in accordance with some embodiments of the present disclosure.

FIG. 11 shows a perspective view of illustrative power pocket sliding door system 1100 having actuators 1121 and 1171, in accordance with some embodiments of the present disclosure. Power pocket sliding door system 1100 includes sliding door 1110, brackets 1111 and 1112, rollers 1114 and 1115, rail 1120, actuators 1121 and 1171, brackets 1123 and 1173, and spindle 1122. Rollers 1114 and 1115 are affixed to sliding door 1110 and travel along rail 1120 such that sliding door 1110 is capable of moving along axis 1199. Actuators 1121 and 1171 are coupled to spindle 1122 and are configured to cause spindle 1122 to move along axis 1199. For example, in some embodiments, one of actuators 1121 or 1171 operates for a period of time (while the other moves passively), and then the other of actuators 1121 or 1171 is actuated (while the other moves passively. Accordingly, the expected life of the actuators may be increased (e.g., the redundancy allows one actuator to be used as a backup or auxiliary actuator). Bracket 1123 affixes actuator 1121 to rail 1120 and bracket 1173 affixes actuator 1171 to rail 1120. Spindle 1122 is affixed to sliding door 1110 by brackets 1111 and 1112. For example, brackets 1111 and 1112 may be connected to sliding door 1110 by fasteners, bushings, mechanical interlocks, any other suitable affixment, or any combination thereof. Sliding door 1110 may be capable of achieving an open position, a closed position, and any intermediate position as controlled by one or both of actuators 1121 and 1171. In some embodiments, rail 1120, actuator 1121, actuator 1171, bracket 1123, bracket 1173, or a combination thereof are secured to a vehicle or other structure by a structural element (e.g., not illustrated).

In an illustrative example, a single actuator may include a corresponding cycle life (e.g., 125,000 cycles for some motors). In some embodiments, two actuators may be included in series to extend the durability life to more cycles (e.g., 250,000 cycles for some motors). To illustrate, the system may include a primary actuator and a secondary actuator such that for first N cycle (e.g., 125,000 cycles) the primary actuator is powered, and then the secondary actuator is used for subsequent cycles (e.g., another 125,000 cycles).

Figure 12:
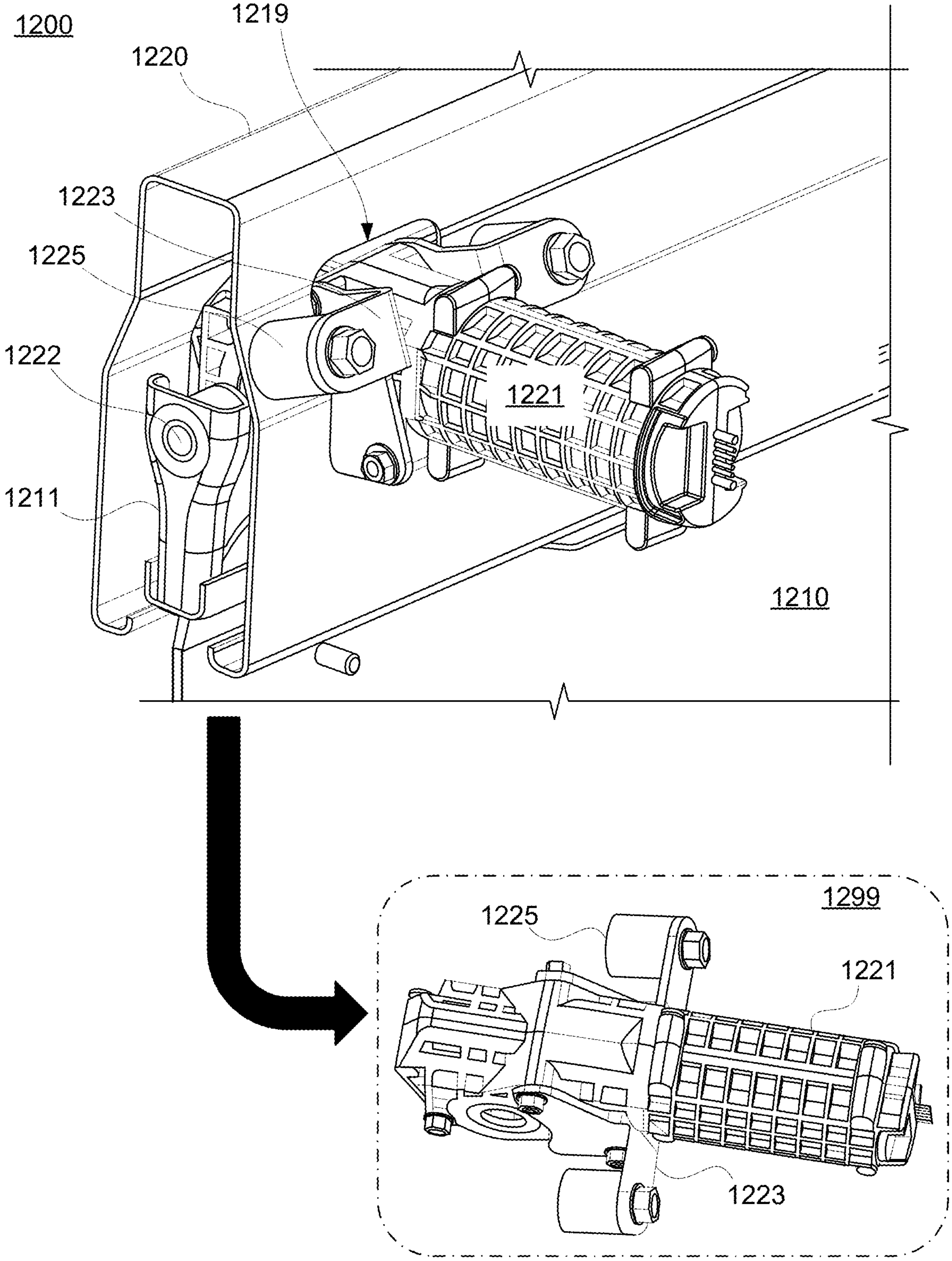
FIG. 12 shows a perspective view of an illustrative power pocket sliding door system with an actuator mounted on a side, in accordance with some embodiments of the present disclosure.

FIG. 12 shows a perspective view of illustrative power pocket sliding door system 1200 with actuator 1221 mounted on a side, in accordance with some embodiments of the present disclosure. In some embodiments, power pocket sliding door system 1200 is similar to power pocket sliding door system 200, with the actuator position rotated to the side instead of the top. Power pocket sliding door system 1200 includes sliding door 1210, bracket 1211 (e.g., and another similar bracket not visible at the other end of sliding door 1210), rail 1220, actuator 1221, bracket 1223, bushing 1225, and spindle 1222. Sliding door 1210 may be coupled to rail 1220 via rollers (not shown) and may travel along rail 1220 such that sliding door 1210 is capable of moving axially. Actuator 1221 is coupled to spindle 1222 and is configured to cause spindle 1222 to move axially. Spindle 1222 is affixed to sliding door 210 by brackets 211 and 212. Sliding door 1210 may be capable of achieving an open position, a closed position, and any intermediate position as controlled by actuator 1221. In some embodiments, rail 1220, actuator 1221, bracket 1223, or a combination thereof are secured to a vehicle or other structure by a structural element. As illustrated, rail 1220 includes cutout 1219 through which spindle 1222 is removable while coupled to actuator 1221. For example, actuator 1221 and spindle 1222 may be decoupled from sliding door 1210 (e.g., by disconnecting bracket 1211 and the other similar bracket), and actuator 1221 and spindle 1222 may be removed through cutout 1219. In some embodiments, as illustrated, bracket 1223 is affixed to rail 1220 using fasteners and one or more bushings 1225 (e.g., rubber bushings) to dampen vibration, impact, or both from being transmitted between actuator 1221 and rail 1220 (e.g., to soften operation and limit mechanical stresses or wear). Panel 1299 shows actuator 1221, bracket 1223, and bushing 1225 as an assembly for purposes of illustration.

Figure 13:
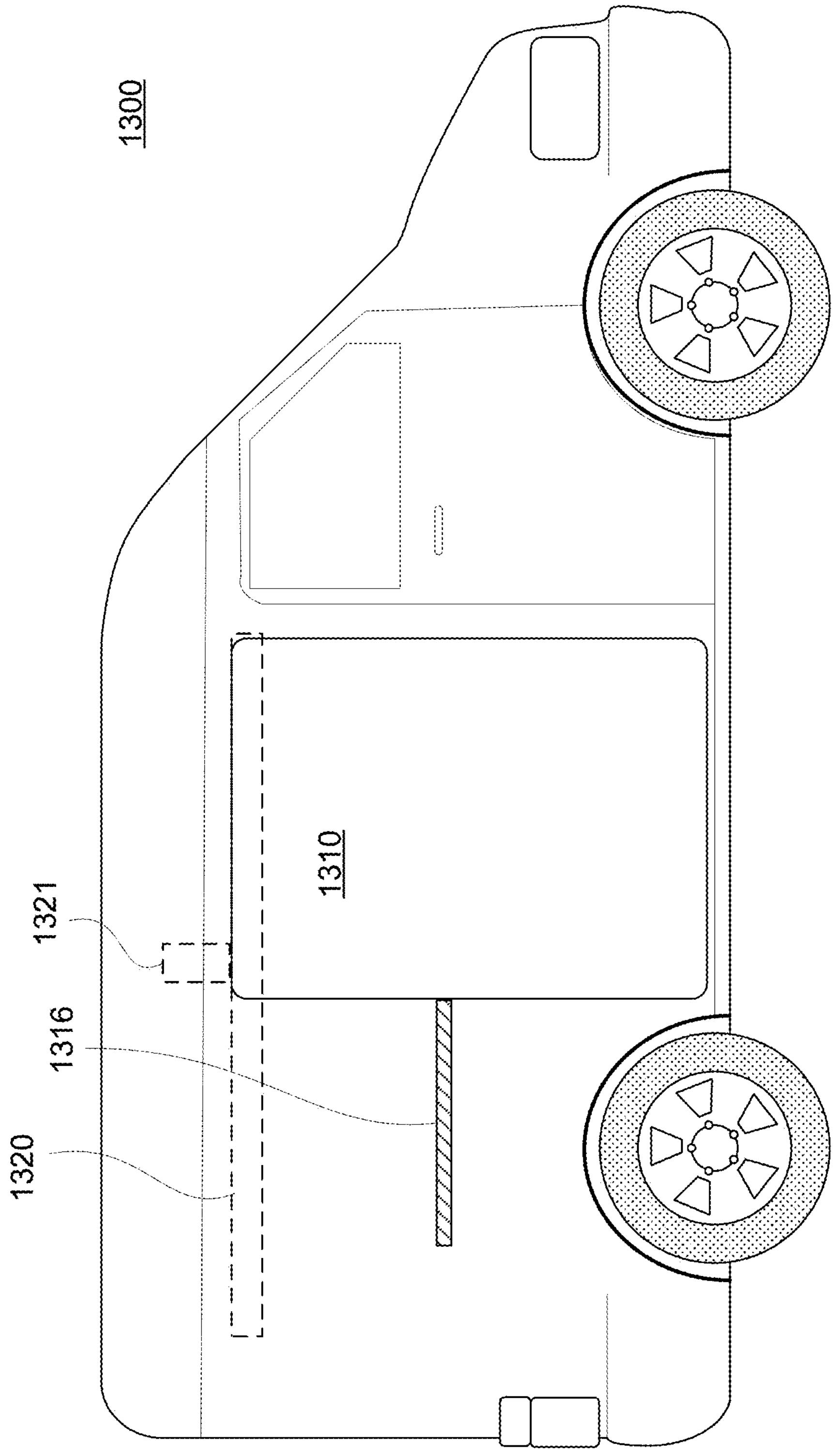
FIG. 13 shows a side view of an illustrative vehicle having a power pocket sliding door system, in accordance with some embodiments of the present disclosure.

FIG. 13 shows a side view of illustrative vehicle 1300 having a power pocket sliding door system, in accordance with some embodiments of the present disclosure. As illustrated, door 1310 is configured to slide open and closed (e.g., using rail 1316 and/or other rails or guides). Door 1310 may include one or more handles, or no handles (e.g., be configured to move under actuator power only). The power pocket sliding door system may include rail 1320 and actuator 1321, which is coupled to a spindle (not shown) similar to the systems of FIGS. 1-5, 7, 11 and 12, for example. To illustrate, actuator 1321 may be controlled by control circuitry of vehicle 1300, which may include, for example, a motor driver, power electronics, relays, switches, sensors, any other suitable components or systems, or any combination thereof.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:

a rail system arranged along a top of a doorway;

a sliding door engaged with the rail system;

a spindle arranged above the sliding door and connected to the sliding door using a first bracket and a second bracket; and an actuator configured to cause the spindle to move axially between an open position and a closed position, wherein the actuator is coupled to the spindle between the first bracket and the second bracket in both the open and closed positions.

2. The system of claim 1, wherein the sliding door comprises a top side, a first longitudinal side, and a second longitudinal side, and wherein the spindle comprises a first end and a second end, the system further comprising:

the first bracket connected to the sliding door on the first longitudinal side at the top side, wherein the first bracket is connected to the spindle at the first end such that the first bracket is constrained from axial motion relative to the spindle; and the second bracket connected to the sliding door on the second longitudinal side at the top side, wherein the second bracket is connected to the spindle at the second end such that the second bracket is constrained from axial motion relative to the spindle.

3. The system of claim 2, further comprising:

a first bushing system that couples the first bracket to the first end of the spindle, wherein the first bushing system is configured to dampen impact between the spindle and the sliding door; and a second bushing system that couples the second bracket to the second end of the spindle, wherein the second bushing system is configured to dampen impact between the spindle and the sliding door.

4. The system of claim 3, wherein the first bushing system comprises:

a first member connected to the first end of the spindle;

a second member connected to the first bracket such that the second member is constrained from rotating relative to the first bracket; and a third member affixed to the second member and engaged with the first member to dampen impact between the first member and the third member.

5. The system of claim 4, wherein the first member comprises a first extension that extends axially through the third member, the second member, and the first bracket, the system further comprising a fastener engaged with the first extension to apply an axial preload to the first bracket, the second member, and the first member.

6. The system of claim 4, wherein:

the first member comprises a plurality of lobes arranged azimuthally;

the third member comprises a plurality of lobe recesses arranged azimuthally; and the plurality of lobes engage with the plurality of lobe recesses to transfer an azimuthal load.

7. The system of claim 1, wherein the spindle is threaded, and wherein the actuator engages with threads of the spindle.

8. The system of claim 1, wherein the rail system comprises a cutout through which the spindle is removable while coupled to the actuator.

9. The system of claim 1, wherein the actuator is mounted on a side of the spindle.

10. The system of claim 9, wherein the actuator is arranged horizontally.

11. The system of claim 1, further comprising a bracket that attaches the actuator to the rail system.

12. A system for managing a sliding door, the system comprising:

a spindle extending axially and configured to be coupled to the sliding door, wherein the spindle comprises a first end and a second end;

an actuator coupled to the spindle and configured to cause the spindle to move axially;

a first bracket connected to the spindle at the first end, wherein the first bracket is configured to be connected to the sliding door; and a second bracket connected to the spindle at the second end, wherein the second bracket is configured to be connected to the sliding door.

13. The system of claim 12, further comprising:

a first bushing system that couples the first bracket to the first end of the spindle, wherein the first bushing system is configured to dampen impact between the spindle and the first bracket; and a second bushing system that couples the second bracket to the second end of the spindle, wherein the second bushing system is configured to dampen impact between the spindle and the second bracket.

14. The system of claim 13, wherein the first bushing system comprises:

a first member connected to the first end of the spindle;

a second member connected to the first bracket such that the second member is constrained from rotating relative to the first bracket; and a third member affixed to the second member and engaged with the first member to dampen impact between the first member and the third member.

15. The system of claim 14, wherein the third member is comprised of a rubber material.

16. The system of claim 14, wherein the first member comprises a first extension that extends axially through the third member, the second member, and the first bracket, the system further comprising a fastener engaged with the first extension to apply an axial preload to the first bracket, the second member, and the first member.

17. The system of claim 14, wherein:

the first member comprises a plurality of lobes arranged azimuthally;

the third member comprises a plurality of lobe recesses arranged azimuthally; and the plurality of lobes engage with the plurality of lobe recesses to transfer an azimuthal load.

18. The system of claim 12, wherein the spindle is threaded, and wherein the actuator engages with threads of the spindle.

19. The system of claim 12, further comprising a bracket, wherein the bracket is configured to attach the actuator to a rail, and wherein the actuator is arranged to the side of the rail.

20. A system comprising:

a rail system arranged along a top of a doorway;

a sliding door engaged with the rail system;

a spindle affixed to and arranged above the sliding door;

a first actuator coupled to the spindle and configured to cause the spindle to move axially; and a second actuator coupled to the spindle and configured to cause the spindle to move axially, wherein the first actuator and the second actuator are spaced axially by a predetermined distance.

* * * * *